United States Patent
Inukai

(10) Patent No.: US 9,537,419 B2
(45) Date of Patent: Jan. 3, 2017

(54) POWER SUPPLY SYSTEM AND IMAGE FORMING APPARATUS HAVING THE SAME

(71) Applicant: BROTHER KOGYO KABUSHIKI KAISHA, Nagoya-shi, Aichi-ken (JP)

(72) Inventor: Katsumi Inukai, Iwakura (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 496 days.

(21) Appl. No.: 14/038,592

(22) Filed: Sep. 26, 2013

(65) Prior Publication Data
US 2014/0186066 A1 Jul. 3, 2014

(30) Foreign Application Priority Data
Dec. 28, 2012 (JP) .................................. 2012-288399

(51) Int. Cl.
*H02M 7/217* (2006.01)
*G03G 15/00* (2006.01)

(52) U.S. Cl.
CPC ............. *H02M 7/217* (2013.01); *G03G 15/80* (2013.01)

(58) Field of Classification Search
CPC ............ H05H 1/36; H05H 1/26; B23K 10/00; B23K 10/006; H02M 7/217; G03G 15/80; H05B 1/02; H05B 1/0241
USPC .................. 219/121.54, 121.57, 121.39, 494, 501,219/497, 216; 399/69, 88
See application file for complete search history.

(56) References Cited

U.S. PATENT DOCUMENTS

| | | | |
|---|---|---|---|
| 5,166,549 A | 11/1992 | DeDoncker | |
| 5,914,538 A | 6/1999 | Kurosawa et al. | |
| 6,269,012 B1 * | 7/2001 | Kusakabe | H02M 7/217 323/239 |
| 6,320,772 B1 | 11/2001 | Doyama et al. | |

(Continued)

FOREIGN PATENT DOCUMENTS

| | | |
|---|---|---|
| CN | 1534403 A | 10/2004 |
| CN | 101114152 A | 1/2008 |

(Continued)

OTHER PUBLICATIONS

U.S. Office Action in related U.S. Appl. No. 13/629,545, Jun. 24, 2015.

(Continued)

*Primary Examiner* — Mark Paschall
(74) *Attorney, Agent, or Firm* — Merchant & Gould P.C.

(57) ABSTRACT

A power supply system includes: a switching power supply configured to rectify and smooth an AC voltage of an AC power supply to generate a predetermined DC voltage; a low-capacity power supply circuit that generates a zero-cross detection signal corresponding to zero-cross points of the AC power supply based on a rectified current flowing in a smoothing capacitor; and a controller configured to receive the zero-cross detection signal from the signal generating circuit and perform a determining process of determining whether it is possible to perform detection process of the zero-cross points based on a voltage value of the zero-cross detection signal. If the control unit determines that it is possible to perform the detection process of the zero-cross points, the control unit performs a zero-cross point detecting process of detecting the zero-cross points based on the zero-cross detection signal.

7 Claims, 6 Drawing Sheets

(56) References Cited

U.S. PATENT DOCUMENTS

| | | | |
|---|---|---|---|
| 8,606,136 B2* | 12/2013 | Shimura | G01R 19/165 |
| | | | 399/67 |
| 2004/0190923 A1 | 9/2004 | Inukai | |
| 2006/0184810 A1 | 8/2006 | Hamaguchi et al. | |
| 2006/0209574 A1 | 9/2006 | Makino | |
| 2008/0024107 A1 | 1/2008 | Shin | |
| 2010/0019809 A1 | 1/2010 | Hwang et al. | |
| 2011/0019452 A1* | 1/2011 | Shinomoto | H02M 1/4208 |
| | | | 363/126 |
| 2011/0123208 A1 | 5/2011 | Inukai | |
| 2011/0175712 A1 | 7/2011 | Franco et al. | |
| 2013/0028623 A1 | 1/2013 | Inukai | |
| 2013/0031396 A1 | 1/2013 | Inukai | |
| 2013/0038318 A1 | 2/2013 | Inukai | |
| 2013/0111237 A1 | 5/2013 | Inukai | |
| 2013/0113292 A1 | 5/2013 | Inukai | |
| 2013/0129373 A1 | 5/2013 | Inukai | |
| 2013/0301316 A1 | 11/2013 | Ertan | |
| 2014/0210264 A1* | 7/2014 | Inukai | H02J 9/061 |
| | | | 307/23 |
| 2014/0233266 A1* | 8/2014 | Inukai | H02M 3/33507 |
| | | | 363/21.01 |

FOREIGN PATENT DOCUMENTS

| | | |
|---|---|---|
| CN | 201110615 Y | 9/2008 |
| CN | 102081336 A | 6/2011 |
| EP | 2 104 401 A1 | 9/2009 |
| EP | 2 194 637 A1 | 6/2010 |
| EP | 2 551 681 A2 | 1/2013 |
| JP | 55-130543 A | 3/1975 |
| JP | 61-030774 A | 2/1986 |
| JP | 62-091265 A | 6/1987 |
| JP | H07-087734 A | 3/1995 |
| JP | 7-308065 A | 11/1995 |
| JP | H09-023638 A | 1/1997 |
| JP | 2004-056946 U | 2/2004 |
| JP | 2004-151998 A | 5/2004 |
| JP | 2004-303469 A | 10/2004 |
| JP | 2006-229310 A | 8/2006 |
| JP | 2010-054306 A | 3/2010 |
| JP | 2010-239774 A | 10/2010 |
| JP | 2011-113807 A | 6/2011 |
| JP | 2011-199976 A | 6/2011 |
| JP | 2011-199976 A | 10/2011 |
| JP | 2013-096902 A | 5/2013 |

OTHER PUBLICATIONS

Office Action issued in related CN application No. 201210364448.2, Feb. 25, 2015.

Office Action issued in related CN Appl. No. 201210364448.2, Aug. 5, 2015.

U.S. Office Action in related U.S. Appl. No. 13/629,545, mailed Dec. 15, 2014.

Office Action issued in related Chinese Patent Application No. 201210364448.2 on Jul. 25, 2014.

Extended European Search Report issued in EP 2186338.5, mailed Apr. 16, 2014.

Chinese Office Action issued in related Chinese Patent Application No. 201310450323.6, mailed Dec. 3, 2015, Including English translation.

Office Action issued in related Japanese Patent Application No. 2011-241367 on Nov. 11, 2014.

U.S. Office Action (Notice of Allowance), issued in related U.S. Appl. No. 13/629,545, mailed Apr. 26, 2016.

U.S. Office Action (Notice of Allowance), issued in related U.S. Appl. No. 13/629,545, mailed Jun. 22, 2016.

U.S. Office Action issued in related U.S. Appl. No. 13/629,545, mailed Dec. 16, 2015, 6 pages.

Office Action issued in related Chinese Patent Application No. 201310450323.6, mailed Aug. 3, 2016, 12 pages.

* cited by examiner

POWER SUPPLY SYSTEM AND IMAGE FORMING APPARATUS HAVING THE SAME

CROSS-REFERENCE TO RELATED APPLICATION

This application is based upon and claims the benefit of priority of Japanese Patent Application No. 2012-288399 filed on Dec. 28, 2012, the contents of which are incorporated herein by reference in its entirety.

BACKGROUND

The present invention relates to a power supply system and an image forming apparatus having the power supply system, and particularly, to a technology for detecting the zero-cross points of an AC voltage.

In the related art, as an example of a technology for detecting the zero-cross points (zero-cross timings) of an AC voltage, there is known a technology disclosed in JP2010-239774A. In JP2010-239774A, there is disclosed a technology for using a photocoupler to detect the zero-cross points of an AC voltage.

SUMMARY

In methods of using photocouplers to detect zero-cross points like in JP2010-239774A, it is possible to appropriately detect zero-cross points. However, the power consumption of photodiodes of the photocouplers is not negligible. For this reason, it has been desired a zero-cross point detecting technology capable of further reducing power consumption while maintaining the reliability of detection.

An object of the present invention is to provide a zero-cross point detecting technology capable of further reducing power consumption while maintaining the reliability of detection.

A power supply system comprising:
a switching power supply configured to rectify and smooth an AC voltage of an AC power supply to generate a predetermined DC voltage;
a low-capacity power supply circuit that includes:
  a first capacitor including a first electrode connected to one end of the AC power supply, and a second electrode;
  a second capacitor that has a first electrode connected to the other end of the AC power supply, and a second electrode;
  a rectifier circuit that is electrically connected between the second electrode of the first capacitor and the second electrode of the second capacitor, and is configured to rectify an AC voltage applied between the first and second capacitors;
  a smoothing capacitor that is connected at a subsequent stage of the rectifier circuit and is configured to smooth the AC voltage; and
  a signal generating circuit that is connected to the smoothing capacitor, and is configured to generate a zero-cross detection signal corresponding to zero-cross points of the AC power supply based on a rectified current flowing in the smoothing capacitor; and
a controller configured to receive the zero-cross detection signal from the signal generating circuit and perform a determining process of determining whether it is possible to perform detection process of the zero-cross points based on a voltage value of the zero-cross detection signal, and
wherein if the control unit determines in the determining process that it is possible to perform the detection process of the zero-cross points, the control unit performs a zero-cross point detecting process of detecting the zero-cross points based on the zero-cross detection signal.

DESCRIPTION OF EXEMPLARY EMBODIMENTS

Embodiment

An embodiment will be described with reference to FIGS. 1 to 6.

1. Description of Printer

Figure 1:
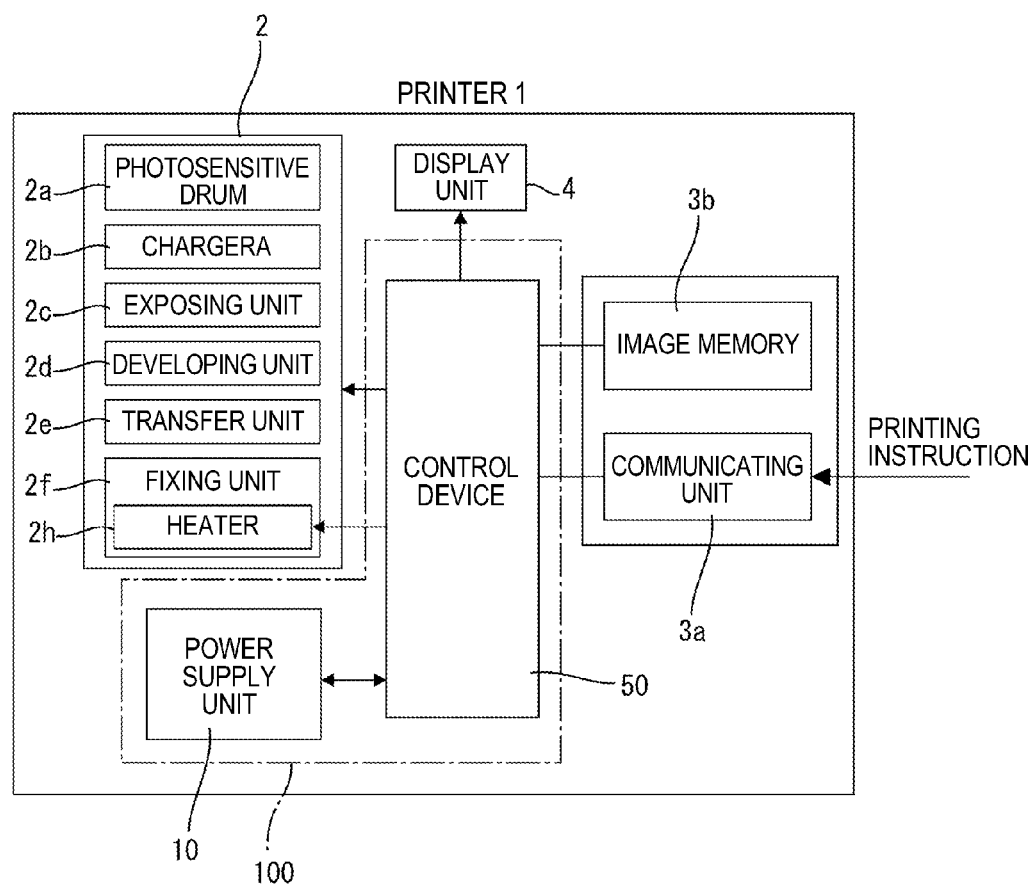
FIG. 1 is a block diagram schematically illustrating the configuration of an image forming apparatus according to an embodiment.

FIG. 1 is a block diagram illustrating the electrical configuration of a printer 1 which is an example of an image forming apparatus. The printer 1 includes a printing unit 2, a communicating unit 3a, an image memory 3b, and a power supply system 100. The power supply system 100 includes a power supply unit 10 and a control device 50. The power supply unit 10 is a power supply for the printer 1, and supplies electric power to the printing unit 2, the communicating unit 3a, the image memory 3b, and the control device 50.

The printing unit 2 includes a photosensitive drum 2a, a charger 2b for performing a charging process of charging the surface of the photosensitive drum 2a, an exposing unit 2c for performing an exposing process of forming an electrostatic latent image on the surface of the photosensitive drum 2a, a developing unit 2d for performing a developing process of attaching developer to the electrostatic latent image formed on the surface of the photosensitive drum 2a, thereby forming a developer image, a transfer unit 2e for performing a transferring process of transferring the developer image onto a recording medium, a fixing unit 2f for performing a fixing process of fixing the transferred developer image on the recording medium, and so on. The fixing unit 2f includes a heater 2h for thermally fixing developer images.

The printing unit 2 performs a charging process, an exposing process, a developing process, a transferring process, and a fixing process, thereby performing a printing process of printing an image based on print data on a recording medium. The communicating unit 3a performs communication with information terminal devices such as a PC, and takes on a function of receiving printing instructions and print data from information terminal devices. The image memory 3b temporarily stores print data received from information terminal devices.

In the above described printer 1, if the communicating unit 3a receives a printing instruction from an information terminal device and receives print data, the control device 50 controls the printing unit 2 such that the printing unit 2 performs a printing process composed of a charging process, an exposing process, a developing process, a transferring process, and a fixing process, thereby printing an image based on the print data on a recording medium. The operating voltage of the printing unit 2 is mostly 24 V, whereas the operating voltages of the communicating unit 3a, the image memory 3b, and the control device 50 are mostly 3.3 V.

Further, the printer 1 has a normal mode and a power saving mode as operating modes. The normal mode is a mode in which the printer 1 is in a state where it can immediately perform a printing process in response to a printing instruction or in a state where it is performing a printing process. Therefore, in the normal mode, the power supply system 100 is operating and supply of electric power to the heater 2h of the fixing unit 2f is being controlled such that the heater is maintained at a temperature at which fixing is possible, or a temperature slightly lower than the temperature at which fixing is possible. The power saving mode is a mode in which the printer 1 is in a standby state without any printing instruction for a predetermined time. In the power saving mode, only a part of the power supply system 100 is operating and electric power is not supplied to the heater 2h of the fixing unit 2f.

2. Configuration of Power Supply System

Subsequently, the configuration of the power supply system 100 will be described with reference to FIG. 2. As described above, the power supply system 100 includes the power supply unit 10 and the control device 50. First, the configuration of the power supply unit 10 of the power supply system 100 will be described. The power supply unit 10 includes a switching power supply 20 and a low-capacity power supply circuit 30.

The switching power supply 20 includes a rectifying/smoothing circuit 21, a control IC 22, a voltage generating circuit 23, a transformer 24, a field effect transistor (FET) Q1, a rectifying/smoothing circuit 25, a voltage detecting circuit 26, and DC to DC converters 27 and 28.

The switching power supply 20 rectifies and smoothes an AC voltage Vac of an AC power supply AC, thereby generating DC voltages of +24 V, +5 V, and +3.3 V in the normal mode. The DC voltage of +24 V (hereinafter, referred to as DC 24 V) is output from a first output terminal OUT1, the DC voltage of +5 V (hereinafter, referred to as DC 5 V) is output from a second output terminal OUT2, and the DC voltage of +3.3V (hereinafter, referred to as DC 3.3 V) is output from a third output terminal OUT3.

The rectifying/smoothing circuit 21 is a so-called capacitor input type, and includes a photodiode for rectifying the AC voltage Vac (for example, 240 V) of the AC power supply AC, and a capacitor for smoothing the rectified voltage. An output of the rectifying/smoothing circuit 21 is applied to a primary coil of the transformer 24.

The transistor Q1 is an N-channel MOSFET, and is turned on or off in response to an on/off signal (PWM signal) given to the gate of the transistor Q1 by the control IC 22. As a result, the primary side of the transformer 24 oscillates such that a voltage is induced in a secondary coil of the transformer 24.

Moreover, on the primary side of the transformer 24, the voltage generating circuit 23 is provided. The voltage generating circuit 23 rectifies and smoothes a voltage induced in an auxiliary coil provided on the primary side of the transformer 24, thereby generating a power supply voltage Vcc for the control IC 22.

The rectifying/smoothing circuit 25 rectifies and smoothes the voltage induced in the secondary coil of the transformer 24, thereby generating DC 24 V.

The voltage detecting circuit 26 includes a photocoupler PC1, and controls a light emitting diode LED1 of the photocoupler PC1 in response to the detected level of the output of DC 24 V of the switching power supply 20 such that the light emitting diode LED1 emits light. The photocoupler PC1 includes a phototransistor PT1 connected to a feedback port FB of the control IC 22. Therefore, a light signal of the light emitting diode LED1 is converted into an electric signal by the phototransistor PT1, and the detected value of the output of DC 24 V is fed back to the feedback port FB of the control IC 22.

The DC to DC converter 27 converts DC 24 V into DC 5 V and outputs DC 5 V, and the DC to DC converter 28 converts DC 24 V into DC 3.3 V and outputs DC 3.3 V.

The control IC 22 controls the on/off signal for the transistor Q1 in response to a control pulse signal Scp input to a control input port EN, such that oscillation of the primary side of the transformer 24 is controlled. In the normal mode, the control IC 22 oscillates the primary side of the transformer 24 such that the DC voltages are generated, and in the power saving mode, the control IC 22 stops output of the on/off signal to the transistor Q1 such that oscillation of the primary side of the transformer 24 stops. That is, in the power saving mode, the DC voltages are not output from the switching power supply 20. When the printer 1 returns from the power saving mode to the normal mode, the control pulse signal Scp is input from the control device 50 to the control input port EN, and thus oscillation of the primary side of the transformer 24 starts in response to the control pulse signal Scp such that the DC voltages are output from the switching power supply 20. That is, in the normal mode of the printer 1, the switching power supply 20 becomes an output mode, and in the power saving mode of the printer 1, the switching power supply 20 becomes an output stop mode. During activating of the switching power supply 20, the power supply voltage is supplied to an input port VH.

Subsequently, the configuration of the control device 50 (an example of a control unit) of the power supply system 100 will be described. The control device 50 includes an application-specific integrated circuit (ASIC) 51, a mode control IC (an example of the control unit) 52, a switching power supply operation control unit 53, and a memory 56.

The ASIC (an example of the control unit) 51 controls the printing unit 2 of the printer 1. The ASIC 51 controls, for example, supply of electric power to the heater 2h of the fixing unit 2f. The mode control IC 52 controls the mode of the printer 1.

The ASIC 51 receives DC 3.3 V as electric power from the DC to DC converter 28 of the switching power supply 20. The ASIC 51 can receive power supply to operate only in the normal mode. If the switching power supply 20 transitions to the output stop mode, that is, the power saving mode, supply of electric power to the ASIC 51 is cut off such that the ASIC 51 stops.

The mode control IC 52 includes a timer 55. In the normal mode, the mode control IC 52 detects the zero-cross points ZP (see FIG. 3) of the AC voltage Vac of the AC power supply AC based on a zero-cross detection signal Pzc input from a zero-cross detecting circuit 34 to a port P4, as will be described below. Further, the mode control IC 52 generates a zero-cross signal Szc, for example, based on the zero-cross points ZP (see FIG. 3), and provides the zero-cross signal Szc to the ASIC 51. Based on the zero-cross signal Szc, the ASIC 51 controls supply of electric power to the heater 2$h$ of the fixing unit 2$f$. The timer 55 is used for purposes such as time measurement during the detection process of the zero-cross points ZP.

A port P1 of the mode control IC 52 is connected to the third output terminal OUT3 of the DC to DC converter 28 through a resistor, and the mode control IC 52 detects DC 3.3 V, thereby monitoring the output of the switching power supply 20. Further, a power supply port P2 of the mode control IC 52 is connected to the output side of the low-capacity power supply circuit 30, and receives electric power from the low-capacity power supply circuit 30 in the normal mode and the power saving mode. In response to mode switching of the printer 1, the mode control IC 52 switches the switching power supply 20 between the output mode and the output stop mode in which oscillation of the switching power supply 20 stops.

In other words, the mode control IC 52 outputs the control pulse signal Scp to the control IC 22, thereby switching the switching power supply 20 between the output mode and the output stop mode. Here, the output mode is a mode in which the primary side of the transformer 24 is made oscillate such that the switching power supply 20 becomes an output state, and corresponds to the normal mode. Meanwhile, the output stop mode is a mode in which oscillation of the transformer 24 is stopped such that output of the switching power supply 20 stops, and corresponds to the power saving mode. As described above, in the power saving mode, since output of the switching power supply 20 stops, the mode control IC 52 and the switching power supply operation control unit 53 of the control device 50 receive electric power from the low-capacity power supply circuit 30.

The switching power supply operation control unit 53 includes a light emitting diode LED2 of a photocoupler PC2 and a transistor Q2. The anode of the light emitting diode LED2 is connected to a power supply line of direct current +5.6 V (hereinafter, referred to as DC 5.6 VB) from the low-capacity power supply circuit 30.

The light emitting diode LED2 constitutes the photocoupler PC2, together with a phototransistor PT2 connected to the control input port EN of the control IC 22 of the switching power supply 20. Therefore, if a control pulse signal Scp is output from a control port P3 of the mode control IC 52 to the base of the transistor Q2, the control pulse signal Scp is optically transmitted through the photocoupler PC2, and is input to the control input port EN of the control IC 22.

The memory 56 includes a ROM and a RAM. The ROM stores various programs to be executed by the ASIC 51 and the mode control IC 52, and the RAM stores various kinds of data when the programs are executed.

As described above, in a case of switching from the power saving mode to the normal mode, due to electric power supplied from the low-capacity power supply circuit 30, the control device 50 generates the control pulse signal Scp to restart oscillation of the switching power supply 20, and transmits the control pulse signal Scp to the switching power supply 20 through the photocoupler PC2 of the switching power supply operation control unit 53. Therefore, it is possible to appropriately use electric power accumulated during the power saving mode to perform switching from the power saving mode to the normal mode.

A user can use a switch S1 to instruct the mode control IC 52 to perform mode switching.

3. Configuration of Low-Capacity Power Supply Circuit

Subsequently, the low-capacity power supply circuit 30 will be described. The low-capacity power supply circuit 30 supplies electric power to the control device 50 in the power saving mode and the normal mode. Specifically, in each mode, the low-capacity power supply circuit 30 supplies electric power to the mode control IC 52 and the switching power supply operation control unit 53 of the control device 50. In the normal mode, according to the amplitude of the AC voltage Vac, the low-capacity power supply circuit 30 supplies electric power from the AC power supply AC to the control device 50 or supplies electric power from DC 5 V of the switching power supply 20 to the control device 50 through a diode D5. In the power saving mode, the low-capacity power supply circuit 30 supplies electric power from a smoothing capacitor C3 to the mode control IC 52 and the switching power supply operation control unit 53. The low-capacity power supply circuit 30 includes a component for detecting the zero-crossing points of the AC power supply AC in the normal mode.

The low-capacity power supply circuit 30 includes a first capacitor C1, a second capacitor C2, a rectifier circuit 31, a zener diode ZD1, the smoothing capacitor C3, and the circuit 34 for generating a pulse for zero-cross detection (an example of a signal generating circuit).

The first capacitor C1 includes a first electrode C1$p$1 and a second electrode C1$p$2, and the first electrode C1$p$1 is connected to one end of the AC power supply AC, and the second electrode C1$p$2 is connected to the rectifier circuit 31. The second capacitor C2 includes a first electrode C2$p$1 and a second electrode C2$p$2, and the first electrode C2$p$1 is connected to the other end of the AC power supply AC, and the second electrode C2$p$2 is connected to the rectifier circuit 31.

The rectifier circuit 31 is electrically connected between the second electrode C1$p$2 of the first capacitor C1 and the second electrode of the second capacitor C2, and rectifies the AC voltage Vac applied to the first and second capacitors C1 and C2. For example, the rectifier circuit 31 is configured by a bridge circuit composed of four diodes D1, D2, D3, and D4. The cathodes of the diode D1 and the diode D2 are connected at a first contact node Nd1, and the anode of the diode D1 is connected to the second electrode C1$p$2 of the first capacitor C1, and the anode of the diode D2 is connected to the second electrode C2$p$2 of the second capacitor C2.

Further, the anodes of the diode D3 and the diode D4 are connected at a second contact node Nd2, and the cathode of the diode D3 is connected to the second electrode C1$p$2 of the first capacitor C1, and the cathode of the diode D4 is connected to the second electrode C2$p$2 of the second capacitor C2. The second contact node Nd2 is connected to a reference potential line Lgd. In the present embodiment, the power supply system 100 is connected to a frame ground. Therefore, the reference potential line Lgd is also grounded such that the potential of the reference potential line Lgd is 0 V.

The smoothing capacitor C3 is connected to the rectifier circuit 31, and smoothes the rectified AC voltage so as to generate a smooth voltage Vch. In the present embodiment, the smooth voltage Vch is 5.0 V to 6.2 V, and is normally 5.6 V. The smoothing capacitor C3 is electrically connected to the output terminal (second output terminal) OUT2 of DC 5

V of the switching power supply 20 through the diode D5. For this reason, when electric power is supplied to the printer 1, the smoothing capacitor C3 can be charged in a short time by DC 5 V of the switching power supply 20. For this reason, when electric power is supplied to the printer 1, the mode control IC 52 becomes operable by DC 5 V of the switching power supply 20.

Here, if the AC power supply for the printer 1 is shut off, the smoothing capacitor C3 has capacitor capacitance capable of ensuring the operation of the mode control IC 52 for a predetermined time HT or more. Therefore, even if the AC power supply is shut off, the mode control IC 52 can continue the operation for the predetermined time HT or more due to supply of electric power from the low-capacity power supply circuit 30. Here, the predetermined time may be set to, for example, 1 s (second).

The diode D5 is for preventing a backward flow from the smoothing capacitor C3 to the DC to DC converter (27) side. The zener diode ZD1 is for suppressing the smooth voltage Vch from rising if the AC voltage Vac of the AC power supply AC rises.

The circuit 34 for generating a pulse for zero-cross detection (hereinafter, referred to simply as a pulse generating circuit) is connected to a current path IP provided at the next stage of the rectifier circuit 31, and generates the zero-cross detection signal Pzc for detecting the zero-cross points ZP of the AC power supply AC, based on a rectified current Irc flowing in the current path IP. The zero-cross detection signal Pzc is provided to the mode control IC 52, and the mode control IC 52 detects the zero-cross points ZP based on the zero-cross detection signal Pzc as will be described below.

Figure 2:
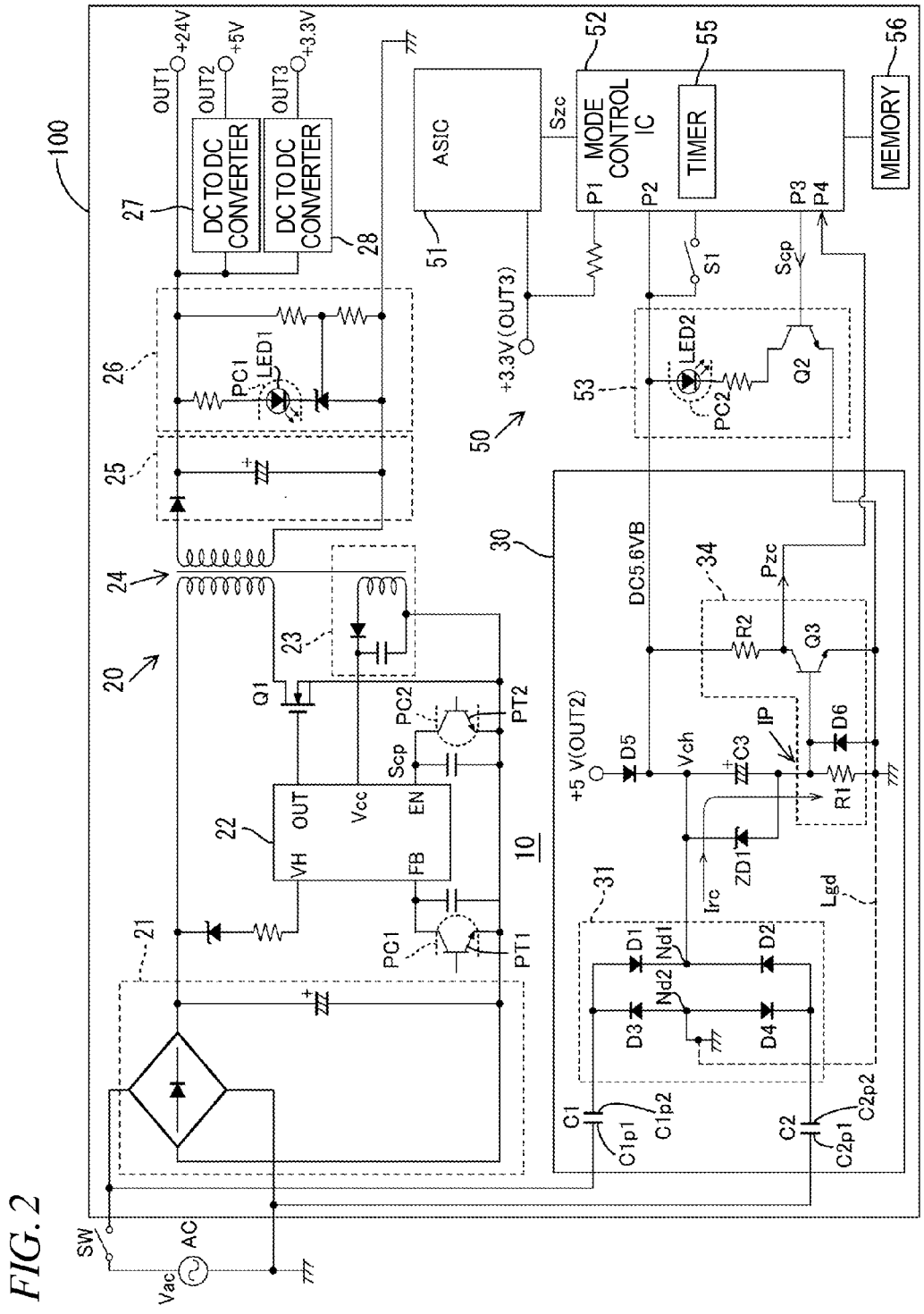
FIG. 2 is a circuit diagram schematically illustrating the configuration of a power supply system according to the embodiment.

As shown in FIG. 2, the pulse generating circuit 34 includes a resistor R1, a resistor R2, a diode D6, and an NPN transistor (hereinafter, referred to simply as a transistor) Q3.

The current path IP is a path from the first contact node Nd1 of the rectifier circuit 31 to the reference potential line Lgd through the smoothing capacitor C3 and the resistor R1, and in the current path IP, the rectified current Irc flows. In other words, the current path IP is a path in which an AC current Iac output from the AC power supply AC flows when the AC current Iac returns to the AC power supply AC.

The transistor Q3 acts as a switching transistor which performs a switching operation according to a base current generated by the rectified current Irc flowing in the current path IP. That is, the transistor Q3 converts the rectified current Irc into the zero-cross detection signal Pzc.

Specifically, the collector of the transistor Q3 is connected to one end of the resistor R2, and the base of the transistor Q3 is connected to the current path IP, and the emitter of the transistor Q3 is connected to the reference potential line Lgd. The resistor R2 is a pull-up resistor, and the other end of the resistor R2 is connected to the power supply line of DC 5.6 VB.

The transistor Q3 is turn on or off in response to the base current supplied to the base. The zero-cross detection signal Pzc is output from the collector of the transistor Q3, is 0 V when the transistor Q3 is in an ON state, and is 5.6 V when the transistor Q3 is in an OFF state. The mode control IC 52 detects the pulse period Tp of the zero-cross detection signal Pzc, and uses the pulse period Tp to detect the zero-crossing points ZP of the AC voltage Vac of the AC power supply AC (see FIG. 3).

The transistor Q3 is not limited to a NPN transistor. The configuration for generating the zero-cross detection signal Pzc is not necessarily limited to the configuration of the transistor Q3 and the resistor R2. For example, the transistor Q3 may be an FET. In this case, it is preferable to provide a current-to-voltage converter circuit for converting the rectified current Irc into a gate voltage. As the current-to-voltage converter circuit, for example, a voltage follower operational amplifier can be used.

4. Method of Detecting Zero-Cross Points

Figure 3:
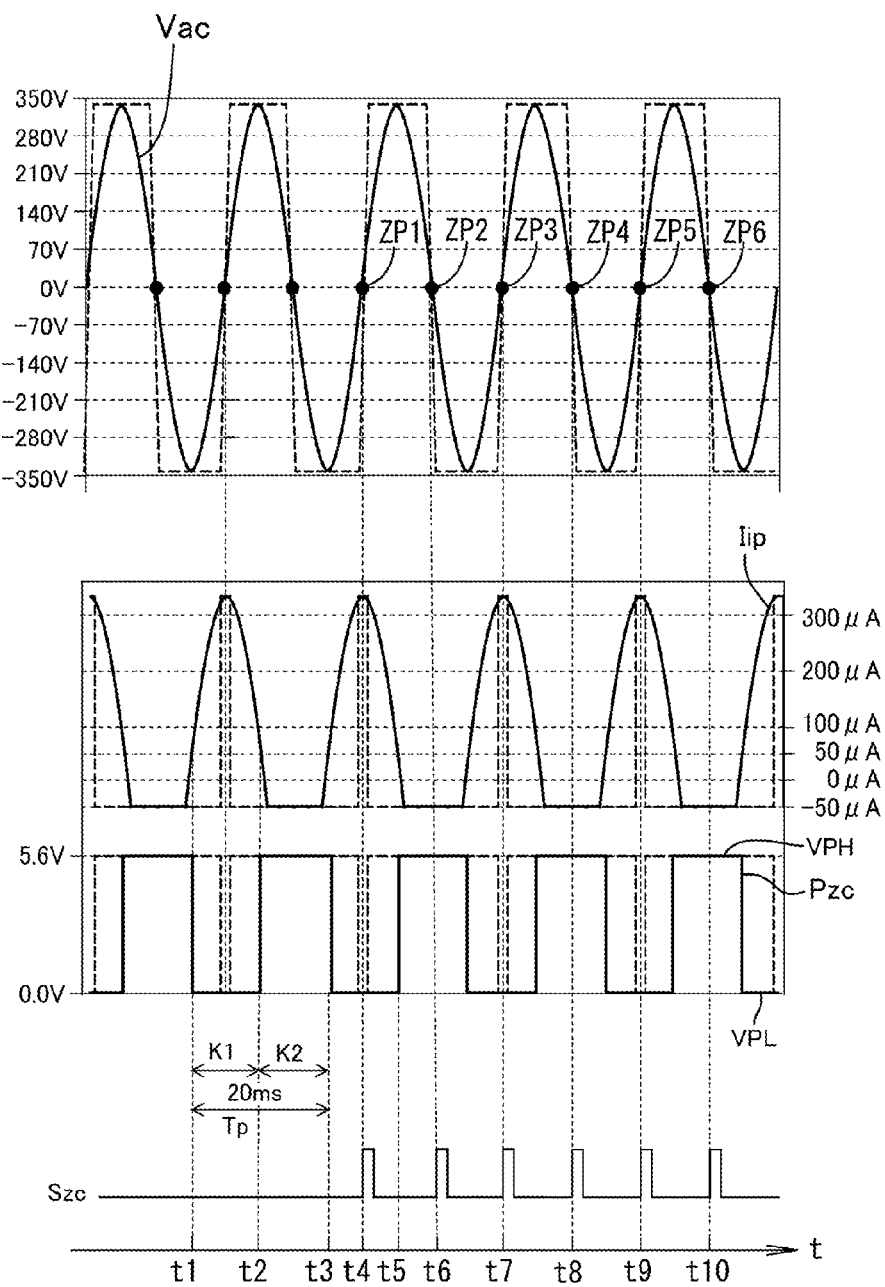
FIG. 3 is a graph illustrating detection process of zero-cross points according to the embodiment.
Figure 4:
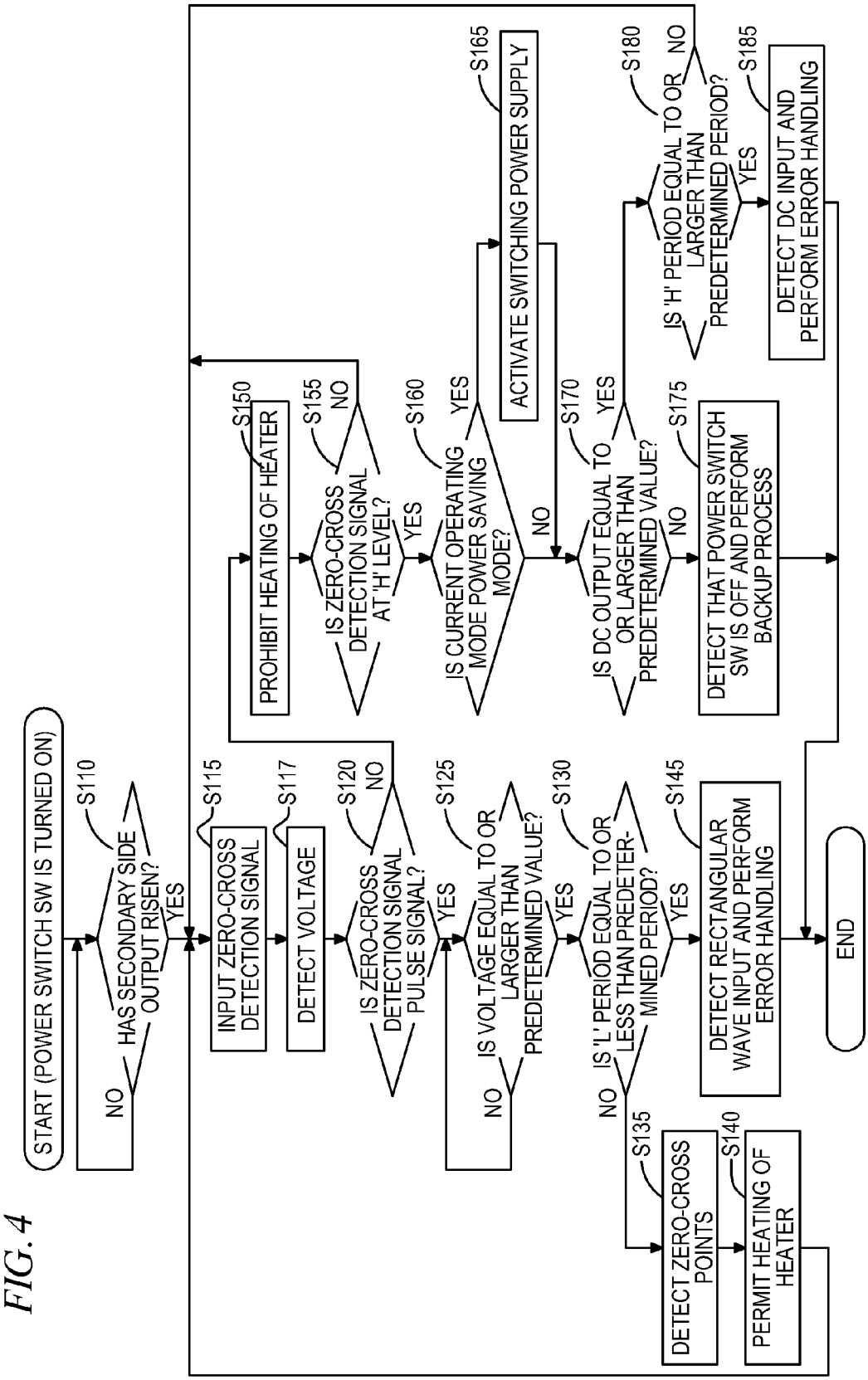
FIG. 4 is a flow chart illustrating processes related to a zero-cross point detection determining process.

Now, a method of detecting zero-crossing points will be described with reference to FIG. 3. FIG. 3 shows waveforms if the frequency of the AC power supply AC is 50 Hz, the AC voltage Vac is 240V (effective value), the capacitances of the capacitors C1 and C2 are 3300 pF (picofarads), the forward voltage drops of the diodes D1 to D4 are 0.6 V, a load current is 50 µA, and the zener voltage of the zener diode ZD1 is 5.6 V, the resistance of the resistor R1 is 120 kΩ and the resistance of the resistor R2 is 1 MΩ. In FIG. 3, a case where a rectangular wave has been input as electric power is schematically shown by a broken line.

As shown in FIG. 3, as the AC voltage Vac increases, a path current Iip which is the total current of the rectified current Irc (the current flowing in the smoothing capacitor C3) and the zener diode ZD1 increases. At a time t1 of FIG. 3, if the voltage drop of the resistor R1, that is, the voltage between the base and emitter of the transistor Q3 exceeds the turn-on voltage of the transistor Q3 due to the path current Iip, the transistor Q3 is turned on, and the zero-cross detection signal Pzc becomes 0 V. After the time t1, according to a change in the AC voltage Vac, the path current Iip further increases. Thereafter, if the path current Iip decreases and thus the voltage drop of the resistor R1 becomes equal to or lower than the turn-on voltage of the transistor Q3 at a time t2, the zero-cross detection signal Pzc becomes about 5.6 V.

If the zero-cross detection signal Pzc becomes 0 V at the time t1 of FIG. 3, the timer 55 of the mode control IC 52 starts to measure a period K1 (from the time t1 to the time t2) in which the zero-cross detection signal Pzc is 0 V.

If the zero-cross detection signal Pzc becomes 5.6 V at the time t2 of FIG. 3, the timer 55 starts to measure a period K2 (from the time t2 to a time t3) in which the zero-cross detection signal Pzc is 5.6 V. Here, the sum of the period K1 and the period K2, that is, a period from the time t1 to the time t3 corresponds to the pulse period Tp of the zero-cross detection signal Pzc, and the timer 55 detects the pulse period Tp of the zero-cross detection signal Pzc. Next, the mode control IC 52 detects a zero-cross point ZP1 based on the pulse period Tp of the zero-cross detection signal Pzc. In the present embodiment, the pulse period Tp becomes 20 ms (milliseconds) which is the same as the period of the AC voltage Vac.

If the pulse period Tp is the sum of the periods K1 and K2, the mode control IC 52 calculates a time t4 of the zero-cross point ZP1 shown in FIG. 3 by the following Equation 1.

$$t4=t3+(K1/2) \qquad \text{Equation 1}$$

Further, the mode control IC 52 calculates a time t6 of a zero-cross point ZP2 shown in FIG. 3 by the following Equation 2.

$$t6=t5+(K2/2) \qquad \text{Equation 2}$$

Here, the times t1 and t3 of FIG. 3 are falling timings of the zero-cross detection signal Pzc, and the times t2 and t5 of FIG. 3 are rising timings of the zero-cross detection signal Pzc. Therefore, it can also be said that the mode control IC 52 detects the zero-cross points ZP based on the rising timings and falling timings of the zero-cross detection signal Pzc.

In the same way, the ASIC 51 calculates times t7 to t10 of zero-crossing points ZP3 to ZP6. Next, the mode control IC 52 generates the zero-cross signal Szc which rises, for example, at the times t4, and t6 to t10 of the zero-crossing points ZP1 to ZP6, and the ASIC 51 performs, for example, control on supply of electric power to the heater 2h of the fixing unit 7, based on the zero-cross signal Szc as described above.

5. Zero-Cross Point Detection Determining Process

Subsequently, a zero-cross point detection determining process of determining whether to perform detection process of zero-cross points based on the voltage value VP of the zero-cross detection signal Pzc will be described. If a power switch SW of the printer 1 is turned on (for example, at the time t0), that is, if electric power is supplied to the printer 1, the zero-cross point detection determining process is performed according to a predetermined program mainly by the mode control IC 52 of the control device 50. Further, a process related to heating of the heater is performed by the ASIC 51. If the power switch SW is not provided, a power cord of the printer 1 is inserted into a power receptacle, this process starts.

In the zero-cross point detection determining process, first, in STEP S110, the mode control IC 52 determines whether the secondary side output of the switching power supply 20 has risen. Here, this determination is made, for example, by determining whether the DC 3.3 V which is the output voltage of the third output terminal OUT3 of the DC to DC converter 28 input to the port P1 is equal to or larger than a predetermined value, for example, 3.0 V. If the DC 3.3 V is less than the predetermined value, that is, 3.0 V (NO in STEP S110), the mode control IC 52 waits for the DC 3.3 V to be equal to or larger than the predetermined value (3.0 V).

Meanwhile, if the DC 3.3 V is equal to or larger than the predetermined value, that is, if it is determined that the secondary side output of the switching power supply 20 has risen (YES in STEP S110), in STEP S115, the mode control IC 52 inputs the zero-cross detection signal Pzc. Subsequently, in STEP S117 (an example of a voltage detecting process), the mode control IC 52 detects the voltage value of the zero-cross detection signal Pzc.

Next, in STEP S120 (an example of a determining process), the mode control IC 52 determines whether the zero-cross detection signal Pzc is a pulse signal. In other words, the mode control IC 52 determines whether the voltage value VP of the zero-cross detection signal Pzc has been maintained at a constant value for a predetermined period or more. The determination on whether the zero-cross detection signal Pzc is a pulse signal is made, for example, by determining whether the detected voltage value VP of the zero-cross detection signal Pzc varies at a predetermined period, here, at a period of 20 ms between a high level VPH and a low level VPL.

If it is determined that the zero-cross detection signal Pzc is a pulse signal (YES in STEP S120), that is, if it is determined that the voltage value VP of the zero-cross detection signal Pzc has not been maintained at a constant value for the predetermined period or more, in STEP S125 (an example of the determining process), the mode control IC 52 determines whether the high level voltage value VPH of the detected zero-cross detection signal Pzc is equal to or larger than a predetermined voltage value. Here, the predetermined voltage value is a voltage value ensuring that the mode control IC 52 will detect the zero-cross points ZP based on the zero-cross detection signal Pzc and generate the zero-cross signal Szc based on the zero-cross points ZP, and may be set to, for example, 3.5 V.

If it is determined that the high level voltage value VPH of the zero-cross detection signal Pzc is less than the predetermined voltage value (NO in STEP S125), the mode control IC 52 waits for the high level voltage value VPH to rise to be the predetermined voltage value (here, 3.5 V) or more. Meanwhile, if it is determined that the high level voltage value VPH of the zero-cross detection signal Pzc is equal to or larger than the predetermined voltage value (YES in STEP S125) (see a time t1 of FIG. 5), in STEP S130 (an example of the determining process), the mode control IC 52 determines whether the period ('L' period) (see a reference symbol "K1" of FIG. 3) of the low level VPL of the zero-cross detection signal Pzc which is a pulse signal is equal to or less than a predetermined period. Here, the predetermined period may be set to, for example, 10 ms (milliseconds) if the frequency of the power supply is 50 Hz and a frame is grounded.

If it is determined that the low level period K1 of the zero-cross detection signal Pzc is not equal to or less than the predetermined period (here, 10 ms), that is, if it is determined that the low level period K1 is larger than 10 ms (NO in STEP S130), the mode control IC 52 determines that the AC power is a sine wave. That is, since the zero-cross detection signal Pzc has risen to a necessary level, and the AC power is normal, the mode control IC 52 determines that it is possible to perform detection process of the zero-cross points. Subsequently, in STEP S135, the mode control IC 52 detects the zero-cross points ZP based on the zero-cross detection signal Pzc by the above described method, and generates the zero-cross signal Szc based on the zero-cross points ZP. Then, the mode control IC 52 provides the zero-cross signal Szc to the ASIC 51. That is, the mode control IC 52 permits heating control in STEP S140. Based on the zero-cross signal Szc, the ASIC 51 performs heating control on the heater 2h of the fixing unit 2f. More specifically, for example, the ASIC 51 controls the conduction angle of a TRIAC (not shown) based on the zero-cross signal Szc, thereby performing heating control on the heater 2h.

As described above, if it is determined in the determining process (STEPS S120, S125, and S130) that it is possible to perform detection process of the zero-cross points ZP according to the zero-cross detection signal Pzc (YES in STEP S120, YES in STEP S125, and NO in STEP S130), the mode control IC 52 generates the zero-cross signal Szc based on the zero-cross points ZP detected by the zero-cross point detecting process of STEP S135, and permits heating of the heater 2h, and the ASIC 51 performs the heating control process on the heater 2h. Therefore, it is possible to accurately perform the heating control process on the heater 2h when electric power is supplied to the printer 1.

Meanwhile, if it is determined in STEP S130 that the low level period of the zero-cross detection signal Pzc is equal to or less than the predetermined period, that is, if it is determined that the low level period K1 is equal to or less than 10 ms (YES in STEP S130), the mode control IC 52 determines that a rectangular wave has been input as AC power, and performs error handling in STEP S145. As the error handling, for example, information about the error is displayed on a display unit 4. Even if print data has been received by the communicating unit (an example of a receiving unit) 3a, the mode control IC 52 performs a prohibiting process of prohibiting the image forming unit 2 from performing image forming based on the print data, as the error handling. As described above, if it is determined based on the zero-cross detection signal Pzc that a voltage of a rectangular wave is being input as a normal AC voltage to the printer 1, image forming is prohibited. Therefore, it is possible to suppress deterioration in the qualities of formed images.

As the error handling, the switching power supply operation control unit 53 may be controlled such that it stops oscillation of the switching power supply 20.

Here, the reason why whether the AC power is a sine wave or a rectangular wave is determined based on the low level period K1 of the zero-cross detection signal Pzc is as follows. That is, as shown in FIG. 3, if the AC power is a rectangular wave, since the path current Iip flows in the smoothing capacitor C3 only when the level of the rectangular wave varies, the low level period K1 is considerably shorter as compared to a case where the AC power is a normal sine wave. Therefore, it is possible to determine whether the AC power a sine wave or a rectangular wave, for example, by comparing the measured low level period K1 with a predetermined determination period based on the low level period K1.

If it is determined in STEP S120 that the zero-cross detection signal Pzc is not a pulse signal (NO in STEP S120), the mode control IC 52 determines that the zero-cross detection signal Pzc is not normal and thus it is impossible to perform detection process of the zero-cross points ZP based on the zero-cross detection signal Pzc, and does not perform heating control on the heater 2h. In other words, in STEP S150, the mode control IC 52 prohibits heating of the heater 2h.

That is, the mode control IC 52 determines whether the voltage value VP of the zero-cross detection signal Pzc has been maintained at a constant value for the predetermined period or more, in the determining process of STEP S120, and if it is determined that the voltage value VP of the zero-cross detection signal Pzc has been maintained at a constant value for the predetermined duration time or more, the mode control IC 52 determines that the zero-cross detection signal Pzc is not a pulse signal (NO in STEP S120), and determines that it is impossible to perform detection process of the zero-cross points ZP according to the zero-cross detection signal Pzc. Here, the predetermined duration time may be set to, for example, 70 ms.

In general, the voltage value VP of the zero-cross detection signal Pzc varies between the high level VPH and the low level VPL in response to the frequency of the power supply. For this reason, a case where the voltage value VP of the zero-cross detection signal Pzc has been maintained at a constant value for the predetermined period or more means that the zero-cross detection signal Pzc had not been formed yet when the power supply was turned on, or that an error has occurred with respect to generation of the zero-cross detection signal Pzc. Therefore, in this case, it is determined that it is impossible to perform detection process of the zero-cross points ZP according to the zero-cross detection signal Pzc, and zero-cross point detection is not performed. Therefore, it is possible to maintain the reliability of the zero-cross point detection.

Next, in STEP S155, the mode control IC 52 determines whether the zero-cross detection signal Pzc has been constant at the high level VPH, here, at 5.6 V, for a predetermined period. Here, the predetermined period may be set to, for example, 70 ms as described above. If it is determined that the zero-cross detection signal Pzc has not been constant at the high level VPH for the predetermined period (NO in STEP S155), that is, if it is determined that the zero-cross detection signal Pzc has been constant at the low level VPL, here, at 0 V, for the predetermined period (here, 70 ms), the mode control IC 52 returns to STEP S115 to maintain the input of the zero-cross detection signal Pzc of the low level VPL. This corresponds to, for example, a case where the AC power supply is on and the zero-cross detection signal Pzc has not risen yet (see a period K3 of FIG. 5).

Meanwhile, if it is determined that the zero-cross detection signal Pzc has been constant at the high level VPH for the predetermined period (YES in STEP S155) (see a time t2 of FIG. 6), in STEP S160, the mode control IC 52 determines whether a current operating mode is the power saving mode. Here, for example, if it is determined that the current operating mode is the power saving mode (YES in STEP S160), in STEP S165, the mode control IC 52 controls the switching power supply operation control unit 53 such that oscillation of the switching power supply 20 starts and the switching power supply 20 is activated. Activating the switching power supply 20 is for detecting a cause why the zero-cross detection signal Pzc is at the high level VPH.

Meanwhile, if it is determined that the current operating mode is not the power saving mode (NO in STEP S160), in STEP S170, the mode control IC 52 determines whether the DC output of the switching power supply 20 is equal to or larger than a predetermined value. Here, the mode control IC 52 monitors, for example, the DC 3.3 V as the DC output of the switching power supply 20, and determines whether the DC 3.3 V is equal to or larger than 0.5 V.

If it is determined that the DC output of the switching power supply 20 is not equal to or larger than the predetermined value (here, 0.5 V) (NO in STEP S170), that is, if it is determined that the DC output of the switching power supply 20 is less than the predetermined value, the mode control IC 52 determines that supply of electric power has been cut off, for example, that a blackout has occurred or the power switch SW has unexpectedly turned off, and performs a backup process in STEP S175. For example, if the power supply is turned off in the middle of printing due to a blackout or the like, the mode control IC 52 stores print data in the memory 56 as the backup process.

Figure 6:
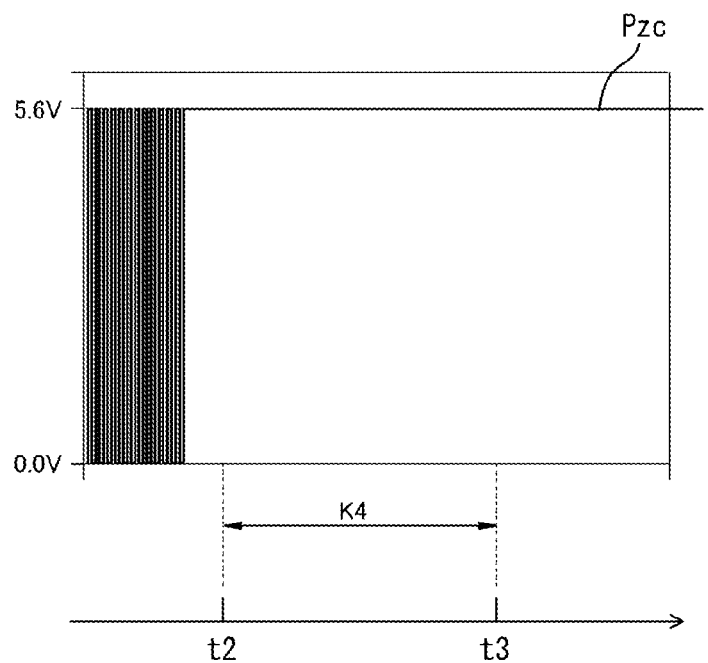
FIG. 6 is a graph illustrating a rising time of another zero-cross detection signal.

Meanwhile, if it is determined that the DC output of the switching power supply 20 is equal to or larger than the predetermined value (0.5 V) (YES in STEP S170), in STEP S180, the mode control IC 52 determines whether the high level duration period ('H' period) of the zero-cross detection signal Pzc is equal to or larger than a predetermined period K4 (see FIG. 6). Here, the predetermined period K4 is a period for which the mode control IC 52 can maintain the operation due to supply of electric power from the smoothing capacitor C3 of the low-capacity power supply circuit 30 even if the AC power supply is shut off, and may be set to, for example, 1 s (second).

If it is determined that the high level duration period of the zero-cross detection signal Pzc is not equal to or larger than the predetermined period K4 (NO in STEP S180), that is, if it is determined that the high level duration period of the zero-cross detection signal Pzc is less than the predetermined period K4, the mode control IC 52 returns to the process of STEP S115 to maintain the input of the zero-cross detection signal Pzc of the high level.

Meanwhile, if it is determined that the high level duration period of the zero-cross detection signal Pzc is equal to or larger than the predetermined period K4 (YES in STEP S180) (see a time t3 of FIG. 6), the mode control IC 52 determines that a DC voltage has been input as a power supply voltage and performs error handling in STEP S185 (an example of an abnormal wave input process). As the error handling, for example, the mode control IC 52 may perform control such that the display unit 4 displays information about the error.

Even if print data has been received by the communicating unit (an example of the receiving unit) 3a, the mode control IC 52 performs the prohibiting process of prohibiting the image forming unit 2 from performing image forming based on the print data, as the error handling. As described above, if it is determined based on the zero-cross detection signal Pzc that an abnormal voltage which is not a sine wave voltage is being input to the printer 1, image forming is prohibited. Therefore, it is possible to suppress deterioration in the qualities of formed images.

As described above, if it is determined that the voltage value of the zero-cross detection signal Pzc during the power saving mode has been maintained at the high level value for the predetermined period or more, the switching power supply 20 is activated. Therefore, it is possible to appropriately detect the cause of the abnormality of the zero-cross detection signal Pzc, that is, input of abnormal electric power, based on a predetermined DC voltage from the switching power supply 20.

The present invention is not limited to a case where all of the processes of the above described STEPS S120, S125, and S130 of determining whether it is possible to perform detection process of the zero-cross points ZP based on the voltage value of the zero-cross detection signal Pzc are performed. For example, the determining process of STEP S120 and processes related to STEP S120 may be omitted. The determining processes of STEPS S120 and S130 may be omitted, and only the determining process of STEP S125 may be performed. Alternatively, the determination of STEP S125 may be omitted, and the determining processes of STEPS S120 and S130 may be performed.

6. Effects of Present Embodiment

Figure 5:
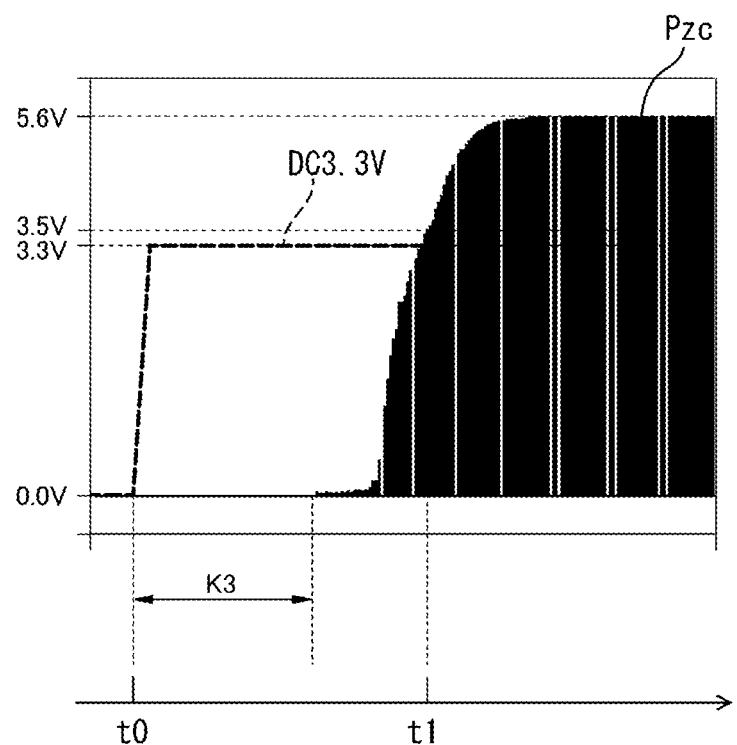
FIG. 5 is a graph illustrating a rising time of a zero-cross detection signal.

Since the zero-cross detection signal Pzc is generated by use of the smoothing capacitor C3 of the low-capacity power supply circuit 30, for example, when supply of AC power to the low-capacity power supply circuit 30 starts, a predetermined delay time is necessary for the high level voltage value VPH of the zero-cross detection signal Pzc to reach a predetermined voltage value, for example, 3.5 V (see FIG. 5). For this reason, if detection process of the zero-cross points ZP starts based on the zero-cross detection signal Pzc of a small high-level voltage value VPH before the high level voltage value VPH of the zero-cross detection signal Pzc reaches the predetermined voltage value, it is feared that the detection process of the zero-cross points ZP will not be reliably performed. In this case, the reliability of the detection is reduced. Therefore, when the zero-cross points ZP are detected based on the zero-cross detection signal Pzc, in the present embodiment, the mode control IC 52 determines whether it is possible to perform detection process of the zero-cross points ZP based on the high level voltage value VPH of the zero-cross detection signal Pzc (STEPS S120, S125, and S130), and if it is determined that it is possible to perform detection process of the zero-cross points ZP (YES in STEP S120, YES in STEP S125, and NO in STEP S130), the mode control IC 52 performs detection process of the zero-cross points ZP. As a result, the reliability of the detection process of the zero-cross points ZP can be maintained.

The rectified current Irc of the low-capacity power supply circuit 30 is much smaller than the rectifier current of the switching power supply 20. For this reason, if the rectified current Irc flowing in the low-capacity power supply circuit 30 is used to perform zero-cross detection, it is possible to perform detection process of the zero-cross points capable of further reducing power consumption as compared to zero-cross detection using a photocoupler according to the related art. Therefore, according to the present embodiment, it is possible to perform detection process of the zero-cross points ZP capable of reducing power consumption while maintaining the reliability of the detection process of the zero-cross points ZP.

If a predetermined condition related to the voltage value VP of the zero-cross detection signal Pzc is satisfied (YES in STEP S125), the mode control IC 52 determines that it is possible to perform detection process of the zero-cross points ZP according to the zero-cross detection signal Pzc. In the present embodiment, the predetermined condition may be set to a condition in which the detected high level voltage value VPH should be equal to or larger than a predetermined value VPth.

That is, if the predetermined condition related to the voltage value VPH of the zero-cross detection signal Pzc is satisfied, it is determined that it is possible to perform detection process of the zero-cross points according to the zero-cross detection signal Pzc. Therefore, even if a predetermined delay time is necessary for the high level voltage value VPH of the zero-cross detection signal Pzc to reach the predetermined voltage value VPth when the power supply system 100 is powered on and supply of AC power to the low-capacity power supply circuit 30 starts, if a condition for avoiding an influence of the delay time is set as the predetermined condition, it is possible to detect the zero-cross points ZP while avoiding an influence of the delay time. As a result, it is possible to perform detection process of the zero-cross points ZP capable of reducing power consumption while maintaining the reliability of the detection. At this time, in the present embodiment, the detection process of the zero-cross points ZP is performed based on the logic high level voltage value VPH of the zero-cross detection signal Pzc. For this reason, if the predetermined voltage value VPth is set to a voltage value such that it is possible to reliably detect zero-cross points ZP, it is possible to maintain the reliability of the zero-cross point detection.

Other Embodiments

The present invention is not limited to the embodiments described with reference to the drawings, but, for example, the following embodiments are included in the technical scope of the present invention.

(1) In the above described embodiment, as the predetermined condition related to the voltage value of the zero-cross detection signal Pzc, a condition in which the high level voltage value VPH of the zero-cross detection signal Pzc should be equal to or larger than the predetermined value VPth has been exemplified. However, the present invention is not limited thereto. For example, the mode control IC 52 may perform a measuring process of measuring an elapsed time from when supply of electric power from the switching power supply 20 to the low-capacity power supply circuit 30 starts, and as the predetermined condition, a condition in which the measured elapsed time should be equal to or larger than a predetermined time may be set. In this case, if the predetermined time is set to a time necessary for the high level voltage value VPH of the zero-cross detection signal Pzc to rise up to a predetermined voltage value VPth such that it is possible to reliably detect the zero-cross points ZP, it is possible to maintain the reliability of the zero-cross point detection.

(2) In the above described embodiment, an example where the reference potential line Lgd is grounded and the frame is grounded has been given. However, the present invention is not limited thereto. The present invention can be applied to a case where the reference potential line Lgd is not grounded, that is, a case where the frame is not grounded.

(3) In the above described embodiment, an example in which the power supply system 100 disclosed in this specification was applied to an image forming apparatus has been given. However, the present invention is not limited thereto. The power supply system 100 can be applied to every apparatus having a normal mode and a power saving mode.

(4) In the above described embodiment, an example in which the control unit is configured by the ASIC 51 and the mode control IC 52 has been given. However, the present invention is not limited thereto. For example, the control unit may be configured only by the ASIC 51 including the operation functions of the mode control IC 52. Alternatively, the control unit may be configured by an ASIC and a plurality of other circuits, or may be configured by a CPU and other separate circuits.

What is claimed is:

1. A power supply system comprising:
    a switching power supply configured to rectify and smooth an AC voltage of an AC power supply to generate a predetermined DC voltage;
    a low-capacity power supply circuit that includes:
        a first capacitor including a first electrode connected to one end of the AC power supply, and a second electrode;
        a second capacitor that has a first electrode connected to the other end of the AC power supply, and a second electrode;
        a rectifier circuit that is electrically connected between the second electrode of the first capacitor and the second electrode of the second capacitor, and is configured to rectify an AC voltage applied between the first and second capacitors;
        a smoothing capacitor that is connected at a subsequent stage of the rectifier circuit and is configured to smooth the AC voltage; and
        a signal generating circuit configured to generate a zero-cross detection signal corresponding to zero-cross points of the AC power supply based on a rectified current flowing in the smoothing capacitor, the signal generating circuit comprising:
            a transistor connected between the smoothing capacitor and the reference potential line; and
            a resistor connected between a collector of the transistor and the rectifier circuit,
            wherein the signal generating circuit converts a rectified current flowing from the rectifier circuit to the reference potential line through the smoothing capacitor, a base of the transistor and an emitter of the transistor into a pulse signal as the zero-cross detection signal; and
    a controller configured to receive the zero-cross detection signal from the signal generating circuit and perform a determining process of determining whether a voltage value of the received zero-cross detection signal is equal to or higher than a predetermined value for at least a first period, and
    wherein if the control unit determines in the determining process that the voltage of the received zero-cross detection signal is not equal to or higher than the predetermined value for at least the first period, the control unit performs a zero-cross point detecting process of detecting the zero-cross points based on the zero-cross detection signal.

2. The power supply system according to claim 1, wherein in the determining process, if a predetermined condition related to the voltage value of the zero-cross detection signal is satisfied, the control unit determines that it is possible to perform the detection process of the zero-cross points according to the zero-cross detection signal.

3. The power supply system according to claim 2, wherein
    the control unit is configured to perform a voltage detecting process of detecting the voltage value of the zero-cross detection signal, and
    the predetermined condition is a condition in which the detected voltage value be equal to or larger than a predetermined value.

4. The power supply system according to claim 2, wherein
    the control unit is configured to perform a measuring process of measuring an elapsed time from when supply of electric power from the switching power supply to the low-capacity power supply circuit starts, and
    the predetermined condition is a condition in which the measured elapsed time be equal to or larger than a predetermined time.

5. The power supply system according to claim 1, wherein
    in the determining process, the control unit is configured to determine whether the voltage value of the zero-cross detection signal has been maintained at a constant value for a predetermined duration time or more, and
    if the control unit determines that the voltage value of the zero-cross detection signal has been maintained at a constant value for the predetermined duration time or more, the control unit determines that it is impossible to perform the detection process of the zero-cross points based on the zero-cross detection signal.

6. The power supply system according to claim 5, wherein:
    the smoothing capacitor has capacitor capacitance capable of ensuring the operation of the control unit for a predetermined period or more if the AC power supply is shut off,
    the control unit is configured to perform a voltage detecting process of detecting the predetermined DC voltage,
    if control unit determines that the voltage value of the zero-cross detection signal has been maintained at a high level for the predetermined duration time or more in a state where supply of electric power from the low-capacity power supply circuit has been received, the control unit performs an activating process of activating the switching power supply,
    if the predetermined DC voltage is not detected within a predetermined time from when the switching power supply is activated, the control unit determines that the AC power supply has been shut off, and
    if detection of the predetermined DC voltage continues even after the predetermined time elapses from when the switching power supply is activated, the control unit determines that an abnormal voltage is being input and performs an abnormal voltage input process.

7. The power supply system according to claim 1, wherein the signal generating circuit comprises a resistor connected between the smoothing capacitor and the reference potential line and the base of the transistor is connected between the smoothing capacitor and the resistor.

\* \* \* \* \*